United States Patent
Ahmed

(10) Patent No.: US 10,121,307 B2
(45) Date of Patent: Nov. 6, 2018

(54) SPEED CHECKING ATTACHMENT FOR USE WITH VIBRATORY CONVEYORS

(71) Applicant: Gulzar Ahmed, Tualatin, OR (US)

(72) Inventor: Gulzar Ahmed, Tualatin, OR (US)

( * ) Notice: Subject to any disclaimer, the term of this patent is extended or adjusted under 35 U.S.C. 154(b) by 128 days.

(21) Appl. No.: 15/453,704

(22) Filed: Mar. 8, 2017

(65) Prior Publication Data

US 2018/0261036 A1    Sep. 13, 2018

(51) Int. Cl.
*B65G 27/32* (2006.01)
*B65G 27/34* (2006.01)
*G07F 13/04* (2006.01)

(52) U.S. Cl.
CPC ............ *G07F 13/04* (2013.01); *B65G 27/32* (2013.01); *B65G 27/34* (2013.01)

(58) Field of Classification Search
CPC ........ B65G 43/08; B65G 43/10; B65G 43/00; B65G 27/32; B65G 27/34; G07F 13/04
See application file for complete search history.

(56) References Cited

U.S. PATENT DOCUMENTS

| | | | | |
|---|---|---|---|---|
| 3,730,386 A | * | 5/1973 | Monsees | B65G 27/34 198/444 |
| 4,540,082 A | * | 9/1985 | Maddocks | B65G 27/34 198/358 |
| 4,979,608 A | * | 12/1990 | Mikata | B65G 27/08 198/566 |
| 5,780,780 A | * | 7/1998 | Ahmed | G01G 11/04 177/119 |
| 6,848,568 B1 | * | 2/2005 | Nibler | B65G 27/34 198/502.2 |
| 8,710,379 B2 | * | 4/2014 | Ahmed | G01G 11/003 177/105 |
| 2006/0090985 A1 | * | 5/2006 | Taylor | B65G 27/12 198/758 |
| 2013/0048470 A1 | * | 2/2013 | Knodell, Jr. | B65G 27/04 198/617 |
| 2017/0144831 A1 | * | 5/2017 | Hodgson | B65D 88/54 |

FOREIGN PATENT DOCUMENTS

EP    2664551 A1 * 11/2013    ............. B65B 1/06

* cited by examiner

*Primary Examiner* — Mark A Deuble
(74) *Attorney, Agent, or Firm* — J. Curtis Edmondson; Law Offices of J. Curtis Edmondson

(57) ABSTRACT

A product speed checking apparatus for attaching to a vibratory conveying system and a method thereof for dispensing product, including a sample pan mounted to capture flow of product between two vibratory conveyors; a first sensor and a second sensor, each placed separately at a predetermined distance from one another and each capable of independently reading product handled by the sample pan; and, a programmable logic controller operatively arranged to calculate an approximate time between the reading of product by the first sensor and the reading of product by the second sensor and computing product speed by dividing distance between two sensors with the travel time between the two sensors.

20 Claims, 4 Drawing Sheets

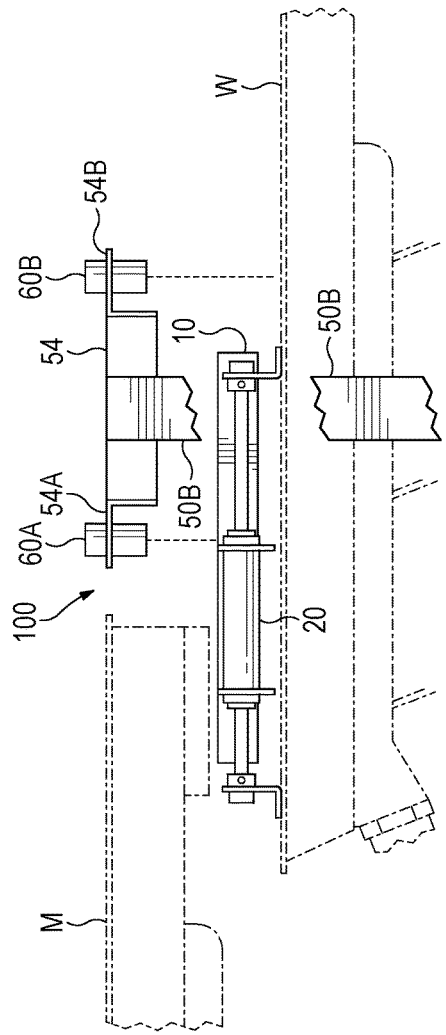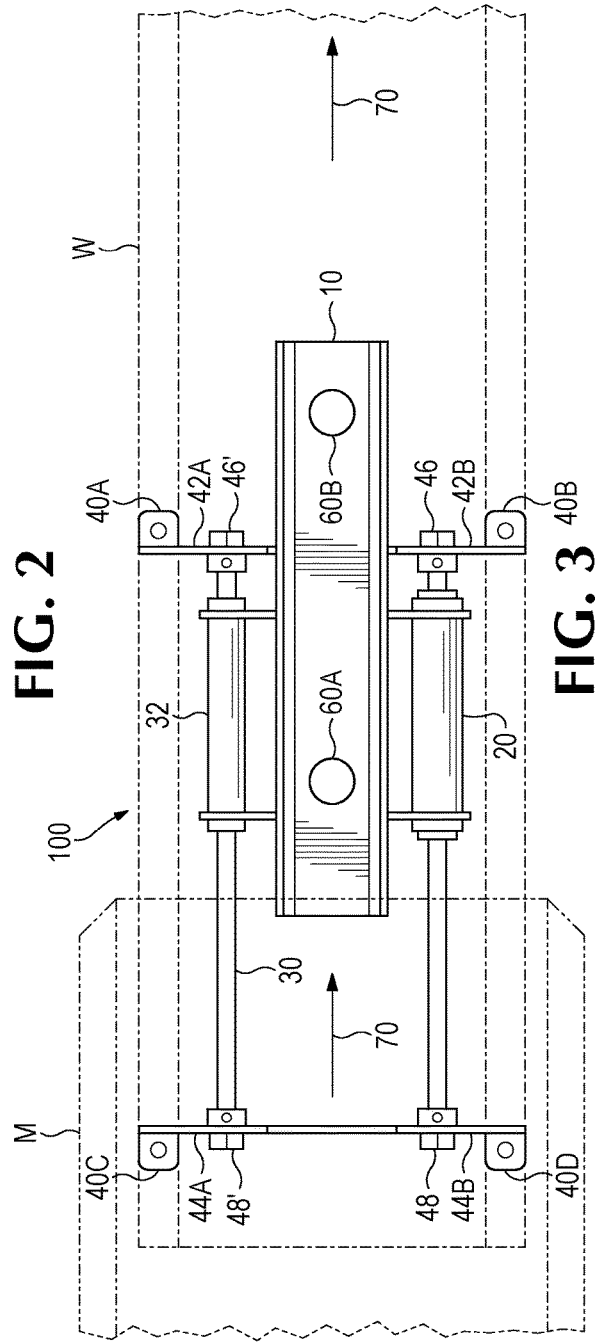

SPEED CHECKING ATTACHMENT FOR USE WITH VIBRATORY CONVEYORS

BACKGROUND

This disclosure relates to vibratory conveyors used for delivering an adjustable and controlled flow rate of a stream of bulk product or consumable particulates. More particularly, this disclosure is directed to measurement of the displacement and speed of the vibrating bulk product as it is fed along the path of the vibratory conveyors.

Vibratory conveyors are recognized, especially as a raw materials unit operation, for minimizing wasted energy, as well as reducing wastes and by-products. It is often desirable to use vibratory conveyors that employ, for example, aluminum or stainless steel pans, trays, chutes, and troughs, as opposed to endless streams of unsanitary conveyor belts for dispersing and weighing unpackaged, bulk-fed foodstuffs. In such an apparatus, there is no conveyor in the usual sense. Rather, a pan, tray, chute or trough is imparted oscillatory motions of small amplitude so that the apparatus stays substantially in one place as foodstuffs and the like, lying thereon are urged to move in continuous flow, typically for dispensation.

Since it is not required to provide for recirculation as is typically required for a conveyor, the pan, tray, chute or trough of the vibratory conveyor may be monolithically, smoothly, and rigidly formed and constructed from, for example, fluoropolymer resins and stainless steel, which may be especially adapted to be easily cleaned and maintain cleanliness. The pan, tray, chute or trough may also be especially adapted for easy removal from the device for such cleaning. The surface of the pan, tray, chute or trough may be coated with an antimicrobial material, as well.

Nonetheless, measuring the weight of the product while using a vibratory conveyor apparatus is a problem recognized within the food manufacturing and packaging industry. This is because the oscillatory motions of the dispenser deleteriously affect whatever weighing apparatus is being used. This is true both in the ability of the weighing apparatus to accurately measure the weight of the product being vibrated and conveyed and in the ability of the weighing apparatus to maintain reliability and longevity during such use.

A known type of vibratory weighing conveyor that overcomes the challenges associated with making an accurate measurement of weight during operation is the Magna Weigh Feeder® manufactured by Crescent Systems, Inc. in Tualatin, Oreg., USA. The Magna Weigh Feeder® is an in-line weighing conveyor designed to feed bulk product by weight. In essence, vibratory weighing conveyors, like the Magna Weigh Feeder®, combine the cleanliness of a vibratory conveyor with the weighing capabilities of a weigh belt. The bulk product conveyed and dispensed with the Magna Weigh Feeder® can accurately measure the product, without disrupting flow rate outputs. A vibratory weighing conveyor, like the Magna Weigh Feeder®, is well adapted for providing an adjustable flow rate.

Still, another problem recognized within industry regarding the use of vibratory conveyors and vibratory weighing conveyors like the Magna Weigh Feeder® is the measurement of speed or velocity of the product in motion. It is easy to measure speed on a belt conveyor because product speed is essentially the same as the belt speed. However, when using a vibratory conveyor or vibratory weighing conveyor, a recirculating belt does not exist and the product is in continuous state of travel, as well as vibration. Further complicating the issue, is that various products behave differently when subjected to vibration.

Accordingly, there is a need for a novel and improved vibratory conveyor or vibratory weighing conveyor that provides for measuring the speed of the product during operation.

The following patents are incorporated by reference herein in their entireties: U.S. Pat. No. 5,780,780 issued on Jul. 14, 1998 to the applicant and U.S. Pat. No. 8,710,379 issued on Apr. 29, 2014 to the applicant.

SUMMARY

In an embodiment of the invention a speed measuring apparatus for attaching to a vibratory system or vibratory weighing system having two or more vibratory conveyors includes a sample pan which is capable of handling product. The sample pan is proximate to a flow of product and mounted to capture the flow of product between the two vibratory conveyors. The sample pan also includes an accumulating position and a discharge position. In this non-limiting embodiment, a first sensor and a second sensor, each placed separately at a predetermined distance from one another and each capable of independently reading product handled by the sample pan are included, as well. Further included is a programmable logic controller operatively arranged to calculate an approximate time between the reading of product by the first sensor and the reading of product by the second sensor.

In another embodiment, the measure of speed of product is a ratio of the predetermined distance between the first and the second sensors and the approximate time between the reading of product by the first sensor and the reading of product by the second sensor.

In an embodiment, an actuator, capable of employing the sample pan between the accumulating position and the discharge position, is further included.

In a non-limiting embodiment, the first sensor and the second sensor are a pair of proximity sensors.

In another embodiment, the first sensor and the second sensor are radar sensors, laser sensors, ultrasonic sensors, optical sensors, photo-electric sensors, and combinations thereof.

A first vibratory conveyor of the two vibratory conveyors can be a metering conveyor or an infeed conveyor, in an embodiment.

In another embodiment, a second vibratory conveyor of the two vibratory conveyors can be a weighing conveyor or a discharge conveyor.

In another embodiment, the product can be snacks, nuts, pet food, free flowing fruits, vegetables and cereals etc.

In another non-limiting embodiment for dispensing product using a vibratory system or vibratory weighing system, the embodiment includes a product capable of being conveyed by vibration; a metering station; a weighing station in connection with the metering station to receive flow of the product therefrom; a sampling station, including a sample pan which is proximate to the flow of the product and mounted to capture the flow of the product between the metering station and the weighing station, and including an accumulating position and a discharge position; a detection station for reading the product on the sample pan of the sampling station, the detection station including a pair of proximity sensors with a first sensor within the pair positioned at a fixed distance from a second sensor within the pair and each sensor within the pair capable of independently reading the product; and, a control station operatively arranged to measure speed and weight of the product and control the flow of the product.

In another embodiment, the vibrations are imparted at rates of about 10 Hertz to about 100 Hertz.

In another non-limiting embodiment, a method for dispensing product using a vibratory weighing system is provided. The method includes steps of: initiating a speed check of a sample from a product flow; loading the sample on a sample pan; reading a sampling product within the sample on the sample pan via a first sensor; vibrating to cause traversal of the sampling product from an accumulating end to a discharge end of the sample pan; reading the sampling product within the sample on the sample pan via a second sensor, wherein the second sensor is placed separately at a predetermined distance from the first sensor; measuring the speed of the sampling product; monitoring the speed of the dispensing product; and, repeating the aforementioned sequence until the dispensing is complete.

In another embodiment speed of the moving product may be checked without weighing. Infeed vibratory conveyor generally feeds product onto discharge vibratory conveyor through a sampling pan mounted on discharge vibratory conveyor. Sampling pan moves towards infeed conveyor to capture product sample and as product moves on sampling pan the two sensors measure the time it takes for product to move from first sensor to second sensor and compute speed by the ratio of distance between two sensors and time for the sample to travel from first sensor to the second. The sampling time between samples may be selected manually to give speed of product in timed intervals.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a close-up view of an example of the attachment shown in FIG. 1, according to embodiments of the invention.

FIG. 3 is a top plan view of an example of the attachment shown in FIG. 1, according to embodiments of the invention.

DETAILED DESCRIPTION

Figure 1:
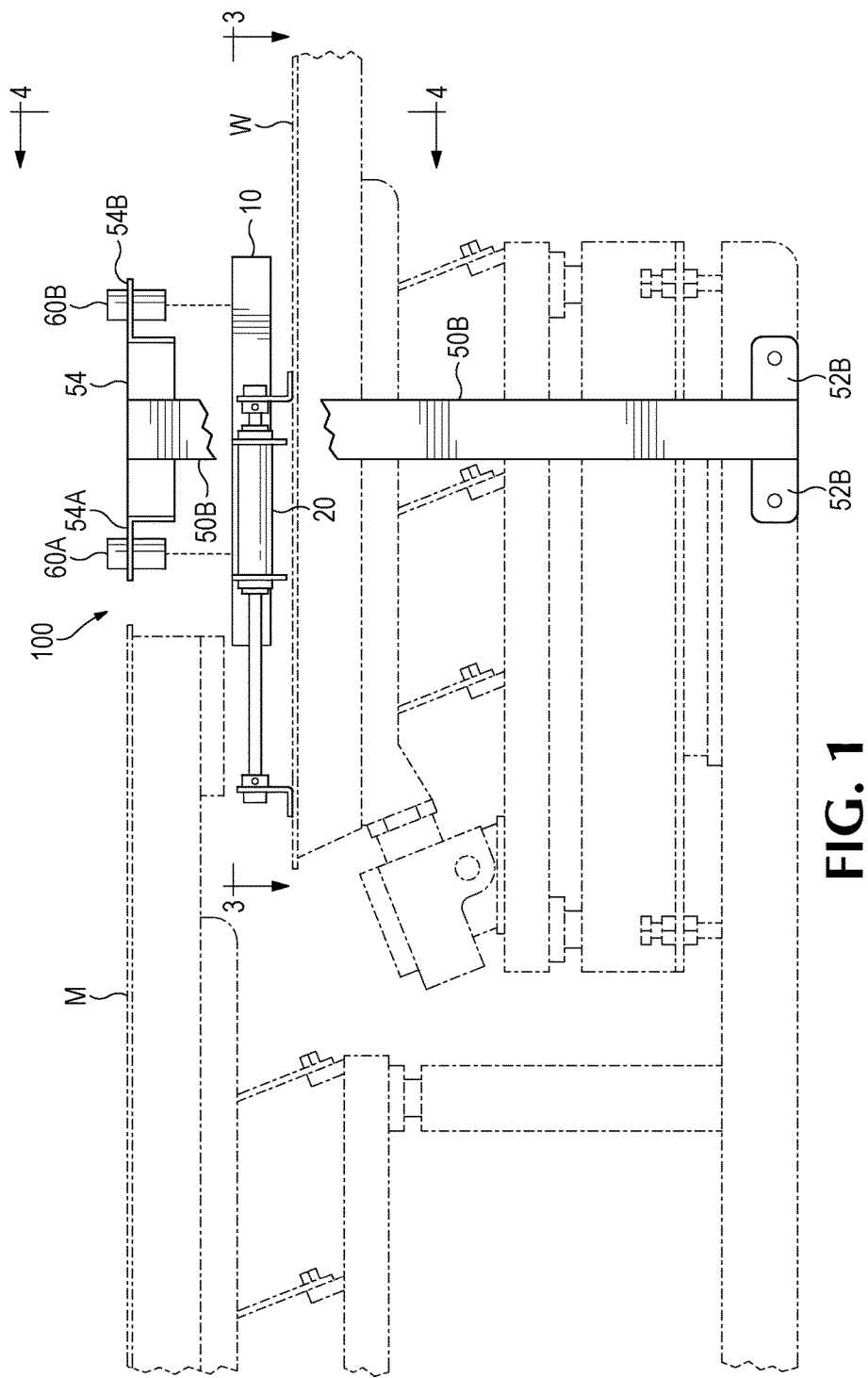
FIG. 1 is a side view of an example of a speed measuring attachment, as attached to a vibratory weighing conveyor, according to embodiments of the invention.

The terms: "vibratory conveyor(s)", "vibratory weighing conveyor(s)", "vibratory checkweighing conveyor(s)", and "vibratory checkweighing system(s)" generally describe, conveyor elements, including but not limited to pans, trays, chutes, and troughs disposed in an in-line sequence for conveying and dispensing bulk product from entry ends to exit ends in a continuous flow and in measured quantities. A widely used vibratory weighing conveyor is the Magna Weigh Feeder® manufactured and sold by Crescent Systems, Inc. in Tualatin, Oreg., USA. Furthermore, the conveyor elements are driven to have oscillatory, periodic movements at rates of about 10 Hertz to about 100 Hertz, thereby causing to convey the product. The periodic movements may be imparted by any number of methods known in the art, including but not limited to electrical, mechanical, electromechanical, electromagnetism, and ferromagnetism. A drive mechanism is manufactured and sold by Crescent Systems, Inc. in Tualatin, Oreg., USA.

The terms: "product" or "bulk product" or "free flowing product" generally describe any raw or intermediate material for dispensation, including but not limited to, a controlled proportion of consumable ingredients in a blend or mixture, such as seasoning for potato chips, additives in cereals, and mixed vegetables. In addition, these terms generally describe any free flowing product including frozen food materials, electrical and mechanical hardware, electrical and mechanical assemblies, and packaged goods.

Unless limited otherwise, the terms "coupled," "attached," and variations thereof herein are used broadly and encompass direct and indirect arrangements. The terms "a" and "an" herein do not denote a limitation of quantity, but rather denote the presence of at least one of the referenced items.

Non-limiting embodiments will now be described in detail, by way of example, with reference to the drawings, where like reference numerals represent like parts throughout the various drawing figures.

The present disclosure provides a measuring attachment 100 to be utilized with a vibratory conveyor or vibratory weighing conveyor having a metering conveyor M and a weighing conveyor W. The attachment 100 is configured to capture a sample of the transfer of product (not shown) between the metering conveyor M and the weighing conveyor W. Sample pan 10 is coupled to actuator 20, which includes guide rods 30. The pan 10, actuator 20, and guide rod 30 are mounted to the weighing conveyor W via mount brackets 40, generally. Sample pan 10 is configured to be mounted above the weighing vibratory conveyor W and in-line with and below a dispensing end of the metering vibratory conveyor M. Support arms 50 (A, B) suspend sensors 60 in an elevated configuration. In order to obtain a speed measurement, the sensors 60 are strategically disposed above the sample pan 10 to monitor product flow 70 which has been captured in the sample pan 10.

Referring to FIG. 1, sample pan 10, two vibratory conveyors (dotted lines) are shown in-line, one being a weighing conveyor W and the second a metering conveyor M. In other non-limiting embodiments of the attachment 100, various other vibratory conveyor types may be used, such as infeed vibratory conveyor and discharge vibratory conveyor, together which are not designed to meter nor weigh product as product is conveyed. Sample pan 10 is disposed in an elevated configuration above the weighing conveyor W and in-line to receive product from the metering conveyor M. The weighing and metering conveyors (W, M) are vibratory and employ load cells (broken lines) for maintaining a constant mass of product by ensuring that the conveyor discharges the same mass flow rate that it receives and does not accumulate or dissipate mass. Thus, different sized product within the product flow 70 (See FIG. 3), is transported at the same rate because the momentary mass flow rate, by way of example, exiting the metering conveyor M equals the momentary entering mass flow rate at a given point in time of the weighing conveyor W.

With continuing reference to FIG. 1, and with reference to FIGS. 2 and 3, a checkweigh control/monitoring control system (not shown) controls the actuator 20 by communicating with solenoids (not shown) for supplying compressed air to a pneumatic cylinder (two-way) that has two states. The compressed air pushes the ram of the air cylinder. This mechanical force is then usable to cause the sample pan 10 traverses about 3 inches rearward (against the product flow 70) and forward (in the same direction as product flow 70) and in up to about 0.5 seconds.

It should be apparent to a person of ordinary skill in the art that various other actuators 20 may be used, depending on the product selected for dispensation. In addition, those of skill in the art will appreciate that any suitable actuator 20 alternative, such as an electrical actuator is contemplated as being within the spirit and scope of the invention.

As illustrated in FIG. 3, guide rod 30 may include a railway bracket 32 for balance and stability of the actuator 20. Other non-limiting configurations of the guide rod 30 and railway bracket 32 may also be employed by the present embodiments.

Figure 4:
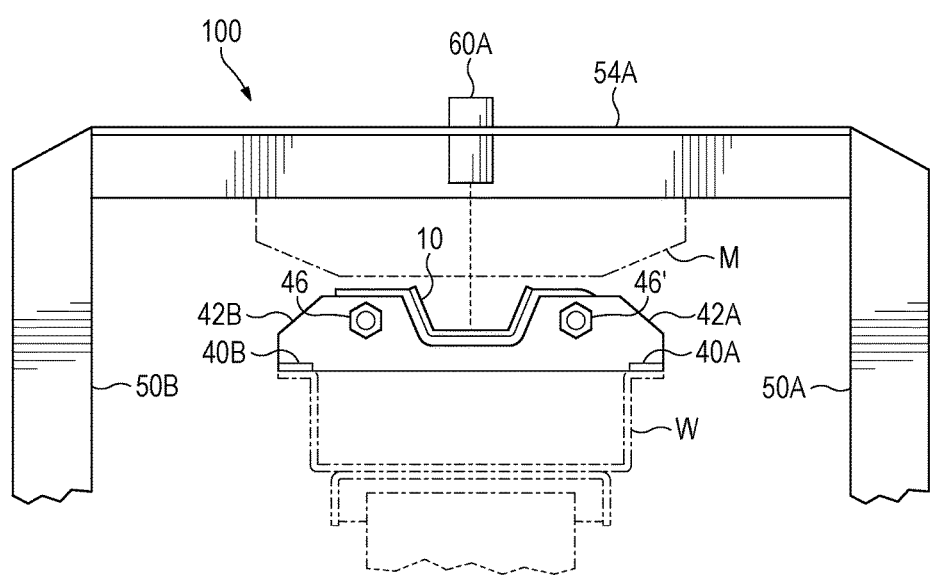
FIG. 4 is an end view of an example of the attachment shown in FIG. 1, according to embodiments of the invention.

Referring to FIGS. 3 and 4, pan 10, actuator 20, and guide rods 30 are attached to the weighing conveyor W with mount brackets 40 (A,B,C,D). Further, front brace 42 includes two sides 42A, 42B for cradling the pan 20. Each side 42A, 42B of the front brace 42 is attached to the weighing conveyor W via corresponding mount brackets 40A, 40B.

Similarly, as illustrated in FIG. 3, rear brace 44 includes two sides 44A, 44B for cradling the rearward side of the pan 10. Each side 44A, 44B of the rear brace 44 is attached to the weighing conveyor W via corresponding mount brackets 40C, 40D.

With continuing reference to FIGS. 3 and 4, front connectors 46 and 46' are illustrated. Front connectors 46 and 46' attach the actuator 20 and guide rod 30 to the front brace 42 at the front end 42A, 42B. In FIG. 3, rear connectors 48 and 48' attach the actuator 20 and guide rod 30 to the back brace 44 at the rear end 44A, 44B.

Referring back to FIGS. 1, 2 and 4, support arms 50 with two arms 50A, 50B, which are fastened to a stabilized structure (dotted line) via brackets 52A (not shown), 52B at the bottom end of the measuring attachment 100 and conjoined at the top end by sensor support 54, which includes a front flange 54A and rear flange 54B for suspending the sensors 60.

As shown in FIG. 3, sensors 60 are made up of a pair of sensors 60 A,B. In a non-limiting embodiment, sensors 60 can be used to measure the speed of bulk product as the product traverses a distance from a first position to a second position, read by the sensor 60A and sensor 60B respectively, while on the sample pan 10.

In a non-limiting embodiment, the sensors 60 A,B are proximity sensors that signal when a product is passing beneath them; i.e., from sensor 60A (first position) to sensor 60B (second position) on the sample pan 10. The information collected by the two proximity sensors 60 A,B set at a distance apart and in conjunction with the pneumatic actuation of the sample pan 10, can be processed to determine the speed of the conveyed product within the unit operation's product flow 70. As product passes underneath/through each proximity sensor 60, each of the sensors 60 A,B reading of the product changes; by way of example, from a "0" to "1" or from "off" to "on." The time lag between the reading changes is measured, and the speed of product is calculated by dividing the sensor 60 A,B (distance between the first and second position) separation distance by the time lag.

Depending on the control/monitoring system, which is described later herein, the sensors 60 A,B may also measure individual product velocities. It should be apparent to a person of ordinary skill in the art that various types of sensors can be used, including but not limited to radar; laser; ultrasonic; optical (diffuse scan); photo-electric; and, proximity sensors. In a preferred embodiment a Laser type sensor—Keyence Model LR—ZBZ40CB was embployed.

Once product becomes a sample by being captured on sample pan 10 and moved out of the continuous product flow 70 by way of actuator 20, a first speed measurement can be calculated in conjunction with using the sensors 60 as described above. If subsequent speed measurements are desired, the sample pan 10 is relocated under the product flow 70 once again, by way of actuator 20, and the process is repeated as many times as desired.

It should be apparent to a person of ordinary skill in the art that the support arms 50 may be coupled/housed/attached at various other positions of the attachment's general structure and design 100, depending on the position of the vibratory conveyors (M,W). In addition, any tamper-proof type fastener may be employed for coupling the brackets 40 and 52 A,B and connectors 46,46' and 48,48' as illustrated in FIGS. 1 through 4.

Other non-limiting configurations of the attachment 100 with the sensors 60 may also be employed by the present embodiments.

Figure 5:
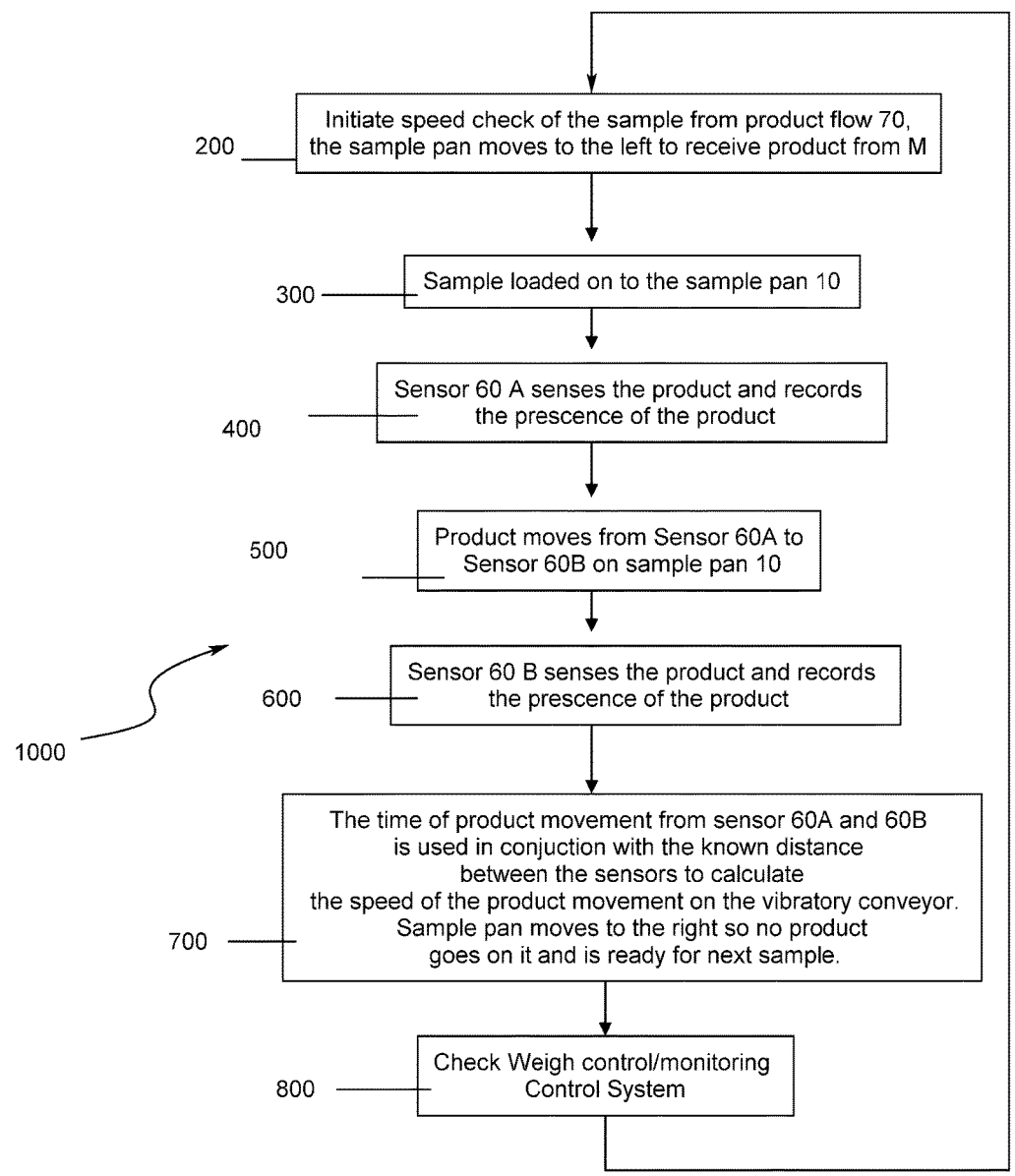
FIG. 5 is a flow diagram of an example method for measuring speed on a vibratory weighing conveyor, according to embodiments of the invention.

Turning to FIG. 5, a sequence 1000 for measuring the speed of the product is illustrated. In a first step 200 of a non-limiting unit operation 1000, reference numeral label 200 provides for initiating a speed check of the sample from product flow 70. Next, step 300 illustrates loading the sample (from the product flow 70) on to sample pan 10. Then, sensor 60A reads the product 400. The product moves from sensor 60A to sensor 60B on sample pan 10, in reference numeral label 500. In step 600, a reading of the product is conducted by sensor 60B. Since the two sensors 60 A,B are spaced apart at a distance (distance between first position and second position), the time of travel of product from sensor 60A to sensor 60B can be used as numerator in the equation speed equals distance traveled/time of travel for calculating the speed of product 700 in, by way of example inches/minute or feet/minute. This process 1000 of speed checking becomes a continuous process and can be monitored and controlled by the checkweigh control/monitoring control system 800.

In an exemplary embodiment, given below in Table-1 are the typical speeds obtained for various free flowing products using the product speed checking apaprtus described above.

TABLE 1

| S.N | Product | Typical Speeds |
|---|---|---|
| 1 | Snacks | 0 to 50 ft/Minute |
| 2 | Veggies | 0 to 70 feet/Minute |
| 3 | Nuts | 0 to 40 Feet/Minute |
| 4 | Grains | 0 to 75 Feet/Minute |
| 5 | Cereals | 0 to 50 Feet/Minute |

The product—snacks is represented by Potato chips, corn chips, pretzels or the like. Fresh Veggies are represented by cut corn, cut carrots, broccoli, peas or the like. Nuts are represented by almonds, hazel nuts, peanuts, walnuts or the like. Grains is represented by wheat, pulses or the like. Cereals is represented by oats, fruit loops, corn flakes or the like. For example if almonds are weighed for packing purposes, and the distance between the two sensors if 6.0 inches and the time difference the product is seen under the frist sensor and the second sensor is 2.0 seconds, the speed of the almonds being conveyed would be 6.0 inches/2.0 seconds=3.0 inches/second or 180 inches/minute or 15 feet/minute.

In a non-limiting embodiment, both duty cycles and velocities can be measured. A processor, such as a programmable logic controller (PLC), can be used in accordance with known vibratory weigh methods and articles for automating duty cycle and velocity measurements and adjustments, as well as increasing production and lowering the giveaway. Further, a checkweigh control/monitoring control system having a PLC can be used to automate operation of actuators and other mechanisms within the unit operation. An exemplar control system is the Allen Bradley SLC 504 PLC with EZ Touch screen.

While the invention has been particularly shown and described with reference to exemplar embodiments, it will be understood by those skilled in the art that various changes in form and detail may be made therein without departing from the spirit and scope of the invention.

What is claimed is:

1. A speed checking apparatus for attaching to a vibratory conveyor, comprising:
    a weighing conveyor;
    a metering conveyor;
    a movable sample pan;
        the movable sample pan configured to be mounted on to the weighing conveyor,
        in-line with and below a dispensing end of the metering conveyor, capable of receiving a product from the metering conveyor and moving from a first position to a second position;
    a first sensor; the first sensor capable of reading a presence of the product on the movable sample pan at the first position on the weighing conveyor;
    a second sensor; the second sensor capable of reading a presence of the product on the movable sample pan at the second position on the weighing conveyor;
    a programmable logic controller operatively arranged to calculate a speed of the product.

2. The apparatus of claim 1, wherein the measure of speed of the product is based on a time difference between the reading of the presence of the product by the first sensor and the second sensor and a distance between the first position and the second position.

3. The apparatus of claim 1, further comprising an actuator capable of employing the sample pan between the first position and the second position.

4. The apparatus of claim 1, wherein the first sensor and the second sensor are proximity sensors.

5. The apparatus of claim 1, wherein the first sensor and the second sensor are a pair of sensors selected from the group consisting of radar, laser, ultrasonic, optical, photoelectric, and combinations thereof.

6. The apparatus of claim 1, wherein a vibratory conveyor comprises at least one of a metering conveyor or an infeed conveyor.

7. The apparatus of claim 6, wherein a vibratory conveyor comprises at least one of a weighing conveyor or a discharge conveyor.

8. The apparatus of claim 1, wherein the programmable logic controller is operatively configured to weigh product while product is conveyed on the two conveyors.

9. The apparatus of claim 1, wherein the product is a free flowing product.

10. An apparatus for dispensing product using a vibratory or weighing conveying system, comprising:
    a product capable of being conveyed by vibration;
    a metering station;
    a weighing station in connection with the metering station to receive flow of the product therefrom;
    a sampling station, the sampling station comprising a sample pan, wherein the sample pan is proximate to the flow of the product and mounted to capture the flow of the product between the metering station and the weighing station,
    the sampling station further comprising an accumulating position and a discharge position;
    a detection station for reading the product on the sample pan of the sampling station, the detection station comprising a pair of proximity sensors, wherein a first sensor within the pair is positioned at a fixed distance from a second sensor within the pair and each sensor within the pair is capable of independently reading the product; and,
    a control station operatively arranged to measure speed and weight of the product and control the flow of the product.

11. The apparatus of claim 10, wherein the measure of speed of the product is a ratio of the distance between the pair of proximity sensors and the approximate time between the reading of product by the first sensor and the reading of product by the second sensor.

12. The apparatus of claim 10, further comprising an actuator capable of employing the sample pan between the accumulating position and the discharge position.

13. The apparatus of claim 10, wherein the vibratory weighing system further comprises vibratory conveyors and vibratory weighers.

14. The apparatus of claim 10, wherein the vibrations are imparted at rates of about 15 Hertz to about 60 Hertz.

15. A method for dispensing product using a vibratory weighing system, comprising:
    (a) initiating a speed check of a sample from a product flow;
    (b) loading the sample on a sample pan;
    (c) reading a sampling product within the sample on the sample pan via a first sensor;
    (d) vibrating to cause traversal of the sampling product from an accumulating end to a discharge end of the sample pan;
    (e) reading the sampling product within the sample on the sample pan via a second sensor, wherein the second sensor is placed separately at a predetermined distance from the first sensor;
    (f) measuring the speed of the sampling product;
    (g) monitoring the weight and speed of the dispensing product to determine throughput; and,
    (h) repeating steps (a) through (g) until the dispensing is complete.

16. The method of claim 15, wherein the vibratory weighing system further comprises vibratory conveyors and vibratory weighers.

17. The method of claim 15, wherein the first sensor and the second sensor are a pair of proximity sensors.

18. The method of claim 15, wherein the first sensor and the second sensor are a pair of sensors selected from the group consisting of radar, laser, ultrasonic, optical, photoelectric, and combinations thereof.

19. The method of claim 15, wherein the speed of the product, selected from the group consisting of snacks, cereals or any free flowing products, is measured without measuring the weight of the product.

20. The method of claim 15, wherein the vibrating is imparted at rates of about 10 Hertz to about 100 Hertz.

* * * * *